(12) United States Patent
Tarahomi et al.

(10) Patent No.: US 9,187,034 B2
(45) Date of Patent: Nov. 17, 2015

(54) LUMINESCENT, ULTRAVIOLET PROTECTED AUTOMOTIVE INTERIOR MEMBERS

(71) Applicant: International Automotive Components Group North America, Inc., Southfield, MI (US)

(72) Inventors: Sassan Tarahomi, Brighton, MI (US); Zachary Seguin, Manchester, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 83 days.

(21) Appl. No.: 13/833,396

(22) Filed: Mar. 15, 2013

(65) Prior Publication Data

US 2014/0264079 A1  Sep. 18, 2014

(51) Int. Cl.
*F21V 9/16* (2006.01)
*G01J 1/58* (2006.01)
*G01T 1/10* (2006.01)
*G21H 3/02* (2006.01)
*G21K 5/00* (2006.01)
(Continued)

(52) U.S. Cl.
CPC .............. *B60Q 3/008* (2013.01); *B60Q 3/0283* (2013.01); *B60R 13/02* (2013.01); *C09K 11/025* (2013.01); *F21K 2/00* (2013.01); *B60R 2013/0287* (2013.01)

(58) Field of Classification Search
CPC .................................. B60Q 3/00; C09K 11/02
USPC .......... 250/459.1, 458.1; 252/301.35, 301.36, 252/301.4 R, 301.6 R
See application file for complete search history.

(56) References Cited

U.S. PATENT DOCUMENTS

| 5,434,013 | A | 7/1995 | Fernandez |
| 5,448,028 | A | 9/1995 | Filion et al. |

(Continued)

FOREIGN PATENT DOCUMENTS

| WO |  | 0152224 | A1 | 7/2001 |  |
| WO | WO2012/099607 |  | * | 7/2012 | ............. C09K 11/06 |

OTHER PUBLICATIONS

"Space environment (natrual and artifical)—Process for determining solar irradiances", International Standard ISO 21348, May 1, 2007.*

(Continued)

*Primary Examiner* — Constantine Hannaher
*Assistant Examiner* — Meenakshi Sahu
(74) *Attorney, Agent, or Firm* — Grossman, Tucker, Perreault & Pfleger, PLLC

(57) ABSTRACT

A component of a motor vehicle comprising a photoluminescent interior member formed of a plastic composition, wherein the plastic composition comprises at least one polymer and a plurality of additives comprising at least one photoluminescent material and at least a first ultraviolet protector, wherein the at least one photoluminescent material absorbs electromagnetic radiation in a first ultraviolet range of an electromagnetic spectrum, and thereafter emits electromagnetic radiation in a visible radiation range of the electromagnetic spectrum, and wherein the first ultraviolet protector is an ultraviolet absorber, wherein the ultraviolet absorber absorbs electromagnetic radiation in a second ultraviolet range of the electromagnetic spectrum and does not absorb electromagnetic radiation in the first ultraviolet range of the electromagnetic spectrum.

20 Claims, 1 Drawing Sheet

(51) Int. Cl.
*H01J 65/06* (2006.01)
*H01J 65/08* (2006.01)
*B60Q 3/00* (2006.01)
*B60Q 3/02* (2006.01)
*B60R 13/02* (2006.01)
*F21K 2/00* (2006.01)
*C09K 11/02* (2006.01)

(56) References Cited

U.S. PATENT DOCUMENTS

| | | | |
|---|---|---|---|
| 5,605,761 | A | 2/1997 | Burns et al. |
| 6,737,596 | B1 | 5/2004 | Hein |
| 6,765,158 | B1 | 7/2004 | Morrison et al. |
| 8,016,465 | B2 | 9/2011 | Egerer et al. |
| 8,408,766 | B2 | 4/2013 | Wilson et al. |
| 2006/0162620 | A1 | 7/2006 | Horton, Jr. et al. |
| 2009/0129107 | A1 | 5/2009 | Egerer et al. |
| 2010/0084575 | A1 | 4/2010 | Wilson et al. |
| 2010/0154261 | A1 | 6/2010 | Bozlo et al. |
| 2010/0247744 | A1 | 9/2010 | Koga et al. |
| 2011/0002138 | A1 | 1/2011 | Hayes et al. |
| 2012/0155089 | A1* | 6/2012 | Agrawal et al. ............... 362/260 |

OTHER PUBLICATIONS

European Search Report, mail date Aug. 5, 2014 issued in related European Patent Application No. 14159736.9 (5 pgs).

Allure Glow International, Allureglow™ Photoluminescent Plastic Masterbatches and Compounds; <<http://www.lightwithoutpower.com/20.html>> (accessed Nov. 13, 2012), 1 pg.

Chroma Corporation "Photoluminescent Disclaimer Notificaton"; <<http://www.chromacolors.com/pdf/chroma-photoluminescent-disclaimer.pdf>> (accessed Nov. 29, 2012), 2 pgs.

Chroma "Glow-In-The-Dark Photoluminescent Plastics, ICO Polymers, Liquid Colorants & Special . . . " <<htpp://www.chromacolors.com/new.html>> (accessed Nov. 13, 2012), 3 pgs.

GlowZone, Inc "Injection Molding Capabilities" <<http://www.glowzone.com/injectionmoldingcapabilities.html>> (accessed Nov. 13, 2012), 2 pgs.

LunaBrite® Light Technology Products; <<http://www.lunabrite.com/products>> (accessed Nov. 13, 2012), 2 pgs.

Milliken ClearShield Crystal-Clear UV Protection; <<http://millikenchemical.com/site/user/files/1/ClearShield_Flyer.pdf>> (accessed Nov. 13, 2012), 1 pg.

ZEUS Technical Whitepaper "UV Properties of Plastics: Transmission & Resistance", <<https://www.yumpu.com/en/document/view/15800119/uv-properties-of-plastics-zeus-industrial-products-inc>> (accessed Nov. 13, 2012), 6 pgs.

* cited by examiner

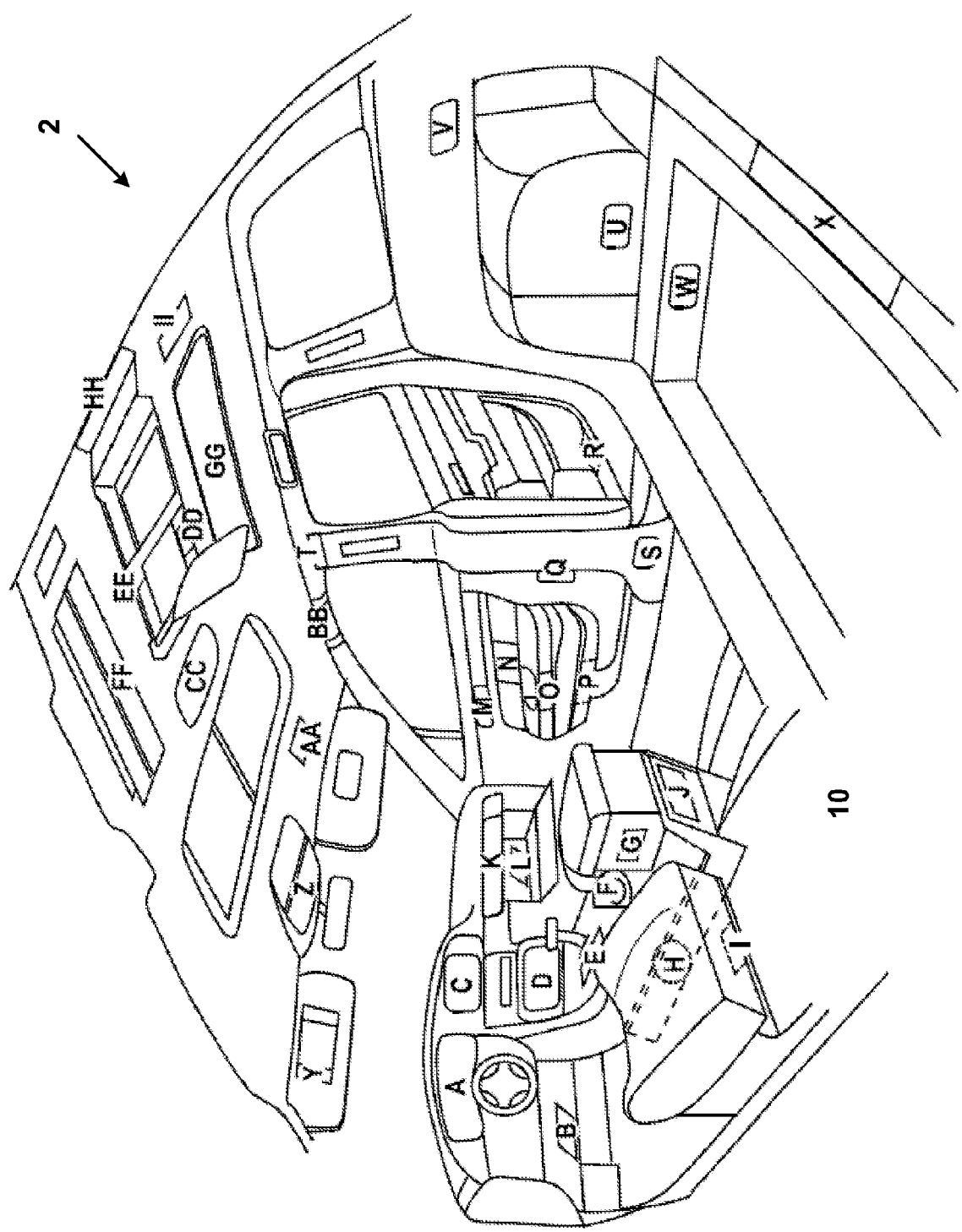

LUMINESCENT, ULTRAVIOLET PROTECTED AUTOMOTIVE INTERIOR MEMBERS

FIELD OF THE INVENTION

This disclosure relates generally to luminescent, ultraviolet protected, plastic products and, more particularly, automotive interior members which include photoluminescent and ultraviolet absorber additives.

BACKGROUND

Automobiles generally provide lighting for various locations in the vehicle by utilizing one or more discreet light bulbs in the immediate area where illumination is desired. More recently, distributed light systems have found use in the vehicle. For example, what started with a single vehicular dome light has now progressed to as many as 40 light sources distributed through the vehicle to illuminate a wide variety of functional areas.

Furthermore, automobiles also make use of a number of lighting technologies. For example, in addition to incandescent lighting, fluorescent lighting, LED illumination, cold cathode technology, and electroluminescent technology may now find use, further adding to the problem of how to most efficiently manage the many locations, operation and power consumption of the differing technologies.

Even with all the vehicle lights used today, certain areas of the vehicle are still particularly prone to poor lighting, particularly at night. For example, vehicle lighting tends to be relatively inadequate in foot wells, lower sitting areas, storage containers and cargo areas. The problem is exacerbated in the evening and in dimly lit garages where ambient light is relatively low. The lighting in these areas often produces adjacent shadowed areas which become more difficult to observe due to the contrast arising between the lighted and shadowed areas.

What is needed is a means to illuminate various areas of a vehicle interior more uniformly to reduce shadowing effects, as well as illuminate various areas without necessarily requiring power from the vehicle.

SUMMARY

In order to provide more uniform lighting in vehicles, such as to reduce shadowing effects, one or more plastic interior members of the vehicle may incorporate one or more luminescent additives. A luminescent material may be understood as a material which emits light, or luminesces, when exposed to light or other electromagnetic radiation. The light, or electromagnetic radiation, emitted from a luminescent material does not result from heating of the material (also known as "cold illumination"), and may be understood to be at a different wavelength from that at which it was absorbed.

In addition to including one or more luminescent additives, the plastic interior member(s) may incorporate one or more ultra-violet protectors to protect from harmful effects of sunlight. In identifying the photoluminescent material(s) and ultraviolet protector(s) for the plastic composition forming the interior member, care must be taken to ensure that no conflict results between proper operation of the two additives. For example, the photoluminescent material of the interior member may require absorption of ultraviolet light in a certain range of the electromagnetic spectrum for proper utilization, which is then re-emitted at a different wavelength. However, if ultraviolet light in the same range of the electromagnetic spectrum is absorbed by an ultraviolet protector, such as an ultraviolet absorber, then the ultraviolet light will not be available for use by the photoluminescent material and, as such, the function of the photoluminescent material will be diminished or eliminated.

As such, the present disclosure provides a component of a motor vehicle comprising: a photoluminescent interior member formed of a plastic composition, wherein the plastic composition comprises at least one polymer and a plurality of additives comprising at least one photoluminescent material and at least a first ultraviolet protector; wherein the at least one photoluminescent material absorbs electromagnetic radiation in a first ultraviolet range of an electromagnetic spectrum, and thereafter emits electromagnetic radiation in a visible radiation range of the electromagnetic spectrum; and wherein the first ultraviolet protector is an ultraviolet absorber, wherein the ultraviolet absorber absorbs electromagnetic radiation in a second ultraviolet range of the electromagnetic spectrum and does not absorb electromagnetic radiation in the first ultraviolet range of the electromagnetic spectrum.

The present disclosure also provides a method of illuminating an interior area of a motor vehicle comprising: providing at least one photoluminescent interior member formed of a plastic composition, wherein the plastic composition comprises at least one polymer and a plurality of additives comprising at least one photoluminescent material and at least a first ultraviolet protector. The at least one photoluminescent material absorbs electromagnetic radiation in a first ultraviolet range of an electromagnetic spectrum, and thereafter emits electromagnetic radiation in a visible radiation range of the electromagnetic spectrum. The first ultraviolet protector is an ultraviolet absorber, wherein the ultraviolet absorber absorbs electromagnetic radiation in a second ultraviolet range of the electromagnetic spectrum and does not absorb electromagnetic radiation in the first ultraviolet range of the electromagnetic spectrum. The electromagnetic radiation in the first range of the electromagnetic spectrum with the at least one photoluminescent material is then absorbed by the photoluminescent interior member, and thereafter emits electromagnetic radiation in the visible radiation range of the electromagnetic spectrum to illuminate the interior area of the motor vehicle.

FIGURES

The above-mentioned and other features of this disclosure, and the manner of attaining them, will become more apparent and better understood by reference to the following description of embodiments described herein taken in conjunction with the accompanying drawings, wherein:

FIG. 1 is a schematic view of a portion of an interior of a motor vehicle illustrating exemplary applications of the present disclosure.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to FIG. 1, there is shown a schematic view of an interior 10 of a motor vehicle 2, illustrating various applications for luminescent interior members according to the present disclosure. It should be understood that the various applications shown are intended to be exemplary and not exhaustive.

Each of the reference characters A to II indicates areas of the interior space where a luminescent interior member may be incorporated.

Reference letter A is an example of a luminescent interior member in the form of a backlighting member for one or more gauges of an instrument panel gauge cluster (e.g. speedometer gauge, rpm gauge, temperature gauge, oil pressure gauge, fuel gauge, battery gauge). Reference letter B is an example of a luminescent interior member in the form of a luminescent trim panel arranged to illuminate the floor area of the motor vehicle, and more particularly a luminescent lower trim or close-out panel of the instrument panel arranged to illuminate the front passenger foot/leg wells of the motor vehicle. Reference C is an example of a luminescent interior member in the form of a backlighting member and/or control knobs for an infotainment center of the motor vehicle. Reference D is an example of a luminescent interior member in the form of a bezel member and/or control knobs for an HVAC controller of the motor vehicle. Reference E is an example of a luminescent interior member in the form of the PRNDL transmission shifter indicator of the motor vehicle. Reference F is an example of a luminescent interior member in the form of a cup holder of the center console. Reference G is an example of a luminescent interior member in the form of a storage container of the center console; Reference H is an example of a luminescent interior member in the form the center console arranged to illuminate the front passenger foot/leg wells; Reference I is an example of a luminescent interior member in the form a seat (front seat backing) arranged to illuminate the rear passenger foot/leg wells. Reference J is an example of a luminescent interior member in the form the center console arranged to illuminate the rear passenger foot/leg wells. Reference K is an example of a luminescent interior member in the form of an instrument panel, which may be a decorative appliqué of the instrument panel. Reference L is an example of a luminescent interior member in the form of a storage container of the instrument panel (e.g. glove box).

Turning to the door trim, reference M is an example of a luminescent interior member in the form of an interior door handle and/or a surrounding bezel. Reference N is an example of a luminescent interior member in the form of a trim insert for the door panel. Reference O is an example of a luminescent interior member in the form of a pull cup or grip pull handle of the door panel. Reference P is an example of a luminescent interior member in the form of a storage pocket of the door panel. References Q and R are examples of a luminescent interior member in the form of the door trim panel, with reference Q arranged at a door edge to indicate to oncoming traffic that the door is open, and reference R arranged to illuminate the ground outside the vehicle when the door is open.

Turning to the remainder of the sidewall and storage areas in the vehicle, reference S is an example of a luminescent interior member in the form of the pillar trim to illuminate the sidewall and rear passenger foot/leg wells. Reference T is an example of a luminescent interior member in the form of an overhead garnish panel to provide light for assistance in vehicle entry/exit. References U, V and W are examples of luminescent interior members in the form in the form of sidewall panels (references U, V) and storage compartment (reference W) to illuminate the rear cargo storage area, such as the vehicle trunk. Reference X is an example of a luminescent interior member in the form of a sill covering plate that may be applied to the sill of any opening to assist to illuminate during loading/unloading under low lighting conditions and may serve as a decorative backlighting feature (logo, design, etc).

The overhead system of the vehicle represents numerous opportunities for illumination. Reference Y is an example of a luminescent interior member in the form of a vanity mirror applied to a visor with illumination, such as an illuminated vanity mirror bezel. Reference Z is an example of a luminescent interior member in the form of a center overhead console with map reading illumination. Reference AA is an example of a luminescent interior member in the form the headliner providing illumination to the passenger compartment. Reference BB is an example of a luminescent interior member in the form the headliner providing illumination to the grab handle. Reference CC is an example of a luminescent interior member in the form of a dome light bezel to provide illumination to locate the light. Reference DD is an example of a luminescent interior member in the form of a rear overhead console to illuminate the console. Reference EE is an example of a luminescent interior member in the form of a rear entertainment center to illuminate the center. Reference FF is an example of a luminescent interior member in the form of an overhead venting member to illuminate the venting member. Reference GG is an example of a luminescent interior member in the form of an overhead lighting panel to illuminate a particular passenger area of the vehicle. Reference HH is an example of a luminescent interior member in the form of a brake light. Reference II is an example of a luminescent interior member in the form of an overhead storage compartment.

Thus, from the foregoing, the luminescent interior member may comprise at least one of an instrument panel member, a sidewall member, a console member, an overhead member, a pillar member, a floor member and a seating member. Furthermore, the luminescent interior member may be used in at least one of a passenger compartment and a storage compartment of the motor vehicle, including the trunk area. Moreover, it should be apparent that the luminescent interior member is arranged to illuminate at least one of a floor area of the vehicle, storage compartment of the vehicle and one or more gauges (e.g. speedometer gauge), indicators (e.g. PRNDL) and/or controllers (e.g. switches, actuators) of the vehicle by directing illumination towards or from such.

According to the present disclosure, to provide illumination, the luminescent interior members, such as those previously described herein, may be formed of a plastic composition comprising at least one polymer and at least one luminescent additive which, may more particularly be a photoluminescent material.

The polymer(s) may be any polymer(s) suitable for forming the luminescent interior member. The polymer may be a thermoplastic polymer such as, for example, a polyolefin (e.g. polypropylene (PP), polyethylene (PE)), acrylonitrile-butadiene-styrene (ABS), polyphenylene oxide (PPO), styrene-maleic-anhydride (SMA) and polycarbonate (PC). More particularly, the polymer may be a rigid thermoplastic material. As used herein, a polymer may be considered rigid if it has a modulus of elasticity either in flexure or in tension greater than 700 MPa (100,000 psi) at 23° C. and 50% relative humidity when tested in accordance with the most recent version of ASTM (America Society for Testing and Materials) D-747, D-790, D-638 or D-882. (See ASTM D 883). However, for other applications, the flexural modulus may be lower.

The polymer may have a flexural modulus as measured in accordance with ASTM Test Method D-790-10 of at least 1,000 MPa at 23° C. to provide sufficient rigidity for certain interior applications. Moreover, the polymer may have a flexural modulus as measured in accordance with ASTM Test Method D-790-10 in a range of 1,000 MPa to 3,000 MPa at 23° C.

In addition to providing sufficient rigidity, the polymer should provide sufficient heat resistance. The polymer may have a heat distortion temperature as measured in accordance with ASTM Test Method D-648-07 of at least 80° C. at 1.8 MPa.

Moreover, the polymer may have a heat distortion temperature as measured in accordance with ASTM Test Method D-648-07 in a range of 80° C. to 110° C. However, for other applications, the heat distortion temperature may be lower.

As used herein, a photoluminescent material may be understood as a luminescent material which absorbs electromagnetic radiation (photons) of a particular wavelength, and then re-radiates the electromagnetic radiation (photons) at a later time.

A photoluminescent material may be categorized as either a fluorescent material or a phosphorescent material. A fluorescent material may be understood to provide photoluminescence as a result of singlet-singlet electronic relaxation (emission from a singlet excited state to a singlet ground state), with a lifetime of nanoseconds (e.g. $10^{-5}$-$10^{-8}$ seconds). Conversely, a phosphorescent material may be understood to provide photoluminescence as a result of triplet-singlet electronic relaxation (emission between a triplet excited state and a singlet ground state, with a typical lifetime of milliseconds to hours (e.g. $10^{-4}$-$10^4$ seconds).

Thus, unlike a fluorescent material, a phosphorescent material does not re-emit the radiation it absorbs as quickly. The slower relaxation time scales of the re-emission are associated with energy state transitions. Such transitions may occur very slowly in certain materials. As such, absorbed radiation may be re-emitted at a lower intensity for up to several hours after the original excitation.

Due to the slower time scales of re-emission particularly associated with phosphorescent materials, the luminescent additive incorporated into a trim member according to the present disclosure is preferably a phosphorescent material. In addition, the phosphorescent material may particularly absorb electromagnetic radiation in the ultraviolet radiation range of the electromagnetic spectrum, and thereafter emit electromagnetic radiation in the visible radiation range of the electromagnetic spectrum for several hours before requiring re-stimulation. The phosphorescent material may more particularly comprise tris(2-phenyl pyridine) iridium, alkaline earth metal sulfide or aluminate crystals such as zinc sulfide, cadmium sulfide, calcium sulfide, strontium sulfide or strontium aluminate, and may further include a small admixture of an impurity or activator such as copper-activated zinc sulfide (ZnS:Cu) or europium-activated strontium aluminate (SrAl$_2$O$_4$:Eu).

In addition to the plastic composition of the interior member comprising at least one polymer and at least one luminescent additive, the plastic composition includes at least one additional additive in the form of an ultraviolet protector.

It may be understood that the most polymers used in automotive applications, are subject to a phenomenon known as photodegradation, which is caused by environmental exposure to ultraviolet radiation and oxygen. Photodegradation may be understood to comprise two distinct chemical processes that together result in chain scission and/or cross-linking in polymer molecules, i.e., the breakage of polymer bonds. In the first of the two processes, photolysis, a polymer absorbs ultraviolet electromagnetic radiation which breaks molecular bonds within the polymer forming free radicals. In the second process, photo-oxidation, the free radicals interact with oxygen to form peroxy radicals.

When polymers are degraded in the forgoing manner, a strong change in morphology results which affects the mechanical behavior of the polymer. For example, the density and crystallinity of the polymer typically increase while its molecular weight and surface roughness decrease. This may result in polymer embrittlement which correspondingly reduces the tensile strength and/or the percent elongation measured "at the break", i.e. at the point when the material breaks under a tensile load.

Photodegradation can be inhibited or stopped by including one or more ultraviolet protectors in the plastic composition used to form the interior member, such as an ultraviolet absorber, ultraviolet stabilizer and/or ultraviolet inhibitor.

An ultraviolet absorber may be understood as a material which absorbs ultraviolet radiation and re-emits the radiation at a less harmful wavelength, mainly as heat energy. Ultraviolet absorbers include benzophenones and benzotriazoles (e.g. substituted benzotriazoles such as 2-(2-hydroxy-5-tert-octylphenyl)benzotriazole, 2-[2-hydroxy-3,5-di-(1,1-dimethylbenzyl)]-2H-benzotriazole, 2-(3'-tert-butyl-2'-hydroxy-5'-methylphenyl)-5-chlorobenzotriazole, or 2-(2H-Benzotriazole-2-yl)-4-methylphenyl). An exemplary ultraviolet absorber may include a Clearshield® ultraviolet absorber from Milliken Chemical sold under the product designation PC90661.

An ultraviolet stabilizer may be understood as a material which neutralizes free radials (free radical scavenger) generated by exposure to ultraviolet radiation (e.g. hindered amine light stabilizer).

An ultraviolet inhibitor may be understood as a material which inhibits or stops an undesired chemical reaction, such as photolysis and/or photo-oxidation, resulting from exposure to ultraviolet radiation. An ultraviolet inhibitor may include an ultraviolet quencher, which may be understood as a material which neutralizes excited molecular species (excited state quencher) which would otherwise break molecular bonds and generate free radicals (e.g. nickel organic complexes).

An ultraviolet protector may also operate in one or more ranges of the ultraviolet spectrum, such as the ultraviolet A range, the ultraviolet B range and/or an ultraviolet in the middle range.

The ultraviolet A range may include ultraviolet light in the wavelength range from about 315-400 nanometers. In this range, the ozone layer absorbs very little solar ultraviolet radiation.

The ultraviolet B range may include ultraviolet light in the wavelength range from about 280-315 nanometers. In this range, most, but not all solar ultraviolet radiation is absorbed in the ozone layer.

An ultraviolet in the middle range includes ultraviolet light in the wavelength range from about 200-280 nanometers. In this range, the ozone layer, molecular oxygen and water vapor of the atmosphere absorb a substantial portion of solar ultraviolet radiation with peak ozone absorption occurring at approximately the 250 nanometer wavelength.

Ultraviolet protectors may be formulated to protect against ultraviolet radiation within the ultraviolet A range and the ultraviolet B range, but may also be formulated to protect against ultraviolet radiation within the ultraviolet middle range.

In identifying the photoluminescent material and ultraviolet protector for the polymer composition forming the interior member, care must be taken to ensure that no conflict results between proper operation of the two additives. For example, the photoluminescent material of the interior member may require absorption of ultraviolet light in a certain range of the electromagnetic spectrum for proper utilization, which is then re-emitted at a different wavelength. However, if the ultraviolet light in a same range of the electromagnetic spectrum is absorbed by an ultraviolet protector, such as an ultraviolet absorber, then the ultraviolet light will not be available for use by the photoluminescent material and, as such, the function of the photoluminescent material will be diminished or eliminated.

Thus, the photoluminescent material should absorb electromagnetic radiation in a first ultraviolet range of an electromagnetic spectrum (and thereafter emit electromagnetic radiation in a visible radiation range of the electromagnetic spectrum), while the ultraviolet protector, when the form of an ultraviolet absorber, should absorb electromagnetic radiation in a second ultraviolet range of the electromagnetic spectrum and not absorb electromagnetic radiation in the first ultraviolet range of the electromagnetic spectrum.

More specifically, for example, the photoluminescent material may absorb electromagnetic radiation in the ultraviolet A range (preferably over the whole range) of an electromagnetic spectrum, and thereafter emit electromagnetic radiation in the visible radiation range of the electromagnetic spectrum, while the ultraviolet protector, if in the form of an ultraviolet absorber, may absorb electromagnetic radiation in at least one of an ultraviolet B range and an ultraviolet in the middle range of the electromagnetic spectrum (preferably over the whole range), and not absorb electromagnetic radiation in the ultraviolet A range of the electromagnetic spectrum. More particularly, the photoluminescent material may emit electromagnetic radiation (light) in the visible radiation range of 400-750 nanometers, and even more particularly in the visible range of blue (450-495 nm), green (495-570 nm), yellow (570-590 nm), red (620-750 nm) each individually or one or more in combination which produce colors such as orange and purple.

In addition to the plastic composition of the interior member comprising at least one polymer, luminescent additive and ultraviolet protector, the plastic composition includes at least one additional additive in the form of a colorant. The colorant may reflect certain wavelengths of visible electromagnetic radiation in the electromagnetic spectrum, and absorb (or scatter) other wavelengths of visible electromagnetic radiation in the electromagnetic spectrum to produce desired colors.

Similar to the ultraviolet material, care must be taken to identify a colorant which does not adversely conflict with proper operation of the photoluminescent material. Again, the photoluminescent material of the interior member may require absorption of ultraviolet light in a certain range of the electromagnetic spectrum for proper utilization, which is then re-emitted. However, if such ultraviolet light in a same range of the electromagnetic spectrum is absorbed by a colorant, then the ultraviolet light will not be available for use by the photoluminescent material and, as such, the function of the photoluminescent material will be diminished or eliminated.

More specifically, for example, the photoluminescent material may absorb electromagnetic radiation in the ultraviolet A range of an electromagnetic spectrum, while the colorant does not absorb electromagnetic radiation in the ultraviolet A range of the electromagnetic spectrum. The colorant may comprise at least of a pigment and a dye.

In certain embodiments, colorants for daytime colors can include pigmentation that absorbs visible light given off by photoluminescent nighttime color. Daytime colors can include, but not limited to, beige, grey, light beige, dark beige, light brown and light grey. However, daytime colors may not include real dark (black, dark grey) since all light is absorbed but hard to emit night time photoluminescent color.

In order for the colorant to not visually interfere with nighttime glowing of the luminescent interior member, the colorant may particularly have a particle size of less than or equal to 0.50 μm (microns), and more particularly in a range of 0.1 μm to 0.50 μm. It has been found that particle sizes above 0.50 μm may result in visual observation of the colorant particles within the luminescent interior member by vehicle occupants under illuminating conditions.

The photoluminescent interior member may further be color matched in the visible radiation range of the electromagnetic spectrum to at least one other interior member of the motor vehicle which is not photoluminescent.

Furthermore, the luminescent interior member may be sufficiently ultraviolet stable to exhibit a Delta E (color change) value of less than 3.0 (i.e. $\Delta E < 3.0$) upon exposure to 1240 $KJ/m^2$ in a xenon arc weatherometer per SAE (Society of Automotive Engineers) J1885, Accelerated Exposure Of Automotive Interior Trim Components Using A Controlled Irradiance Water Cooled Arc Apparatus.

In order to produce a luminescent interior member according to the present disclosure, the photoluminescent material(s), ultraviolet protector(s) and colorant(s) may all be melt compounded with the polymer(s) in an extruder to produce a masterbatch in pellet form having a composition of approximately 50% polymer(s) and 50% of the additive package (i.e. photoluminescent material(s), ultraviolet protector(s) and colorant(s)).

Thereafter, the concentrated additive masterbatch pellets may be further mixed/diluted with the polymer during molding, such as during injection molding, of the luminescent interior member to provide the appropriate additive concentration in the luminescent interior member. The molded-in color luminescent interior member may have a wall thickness between 1.5 to 2.5 mm and may be molded by conventional injection molding techniques. Thereafter, the luminescent interior member may be used in the motor vehicle without application of colored paint or other secondary operations which may cover the exposed surface of the luminescent interior member.

In the luminescent interior member, the individual components may have the following weight ranges.

| Component | % weight |
|---|---|
| Polymer(s) | 60-70 |
| Photoluminescent material(s) (as masterbatch of polymer with 10-40% active photoluminescent material) | 30-40 |
| Ultra-violet protector(s) | 0.5-1.0 |
| Colorant(s) | 2-3 |

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. A component of a motor vehicle comprising:
an injection molded photoluminescent interior member having a thickness of 1.5 mm to 2.5 mm, wherein the injection molded photoluminescent interior member is formed of a plastic composition, wherein the plastic composition comprises a blend of at least one polymer and a plurality of additives comprising at least one photoluminescent material and at least a first ultraviolet protector;
wherein the at least one photoluminescent material absorbs electromagnetic radiation in a first ultraviolet range of an electromagnetic spectrum, and thereafter emits electromagnetic radiation in a visible radiation range of the electromagnetic spectrum;
wherein the first ultraviolet protector is an ultraviolet absorber, wherein the ultraviolet absorber absorbs electromagnetic radiation in a second ultraviolet range of the electromagnetic spectrum and does not absorb electromagnetic radiation in the first ultraviolet range of the electromagnetic spectrum.

2. The component of claim 1 wherein:
the first ultraviolet range of an electromagnetic spectrum is an ultraviolet A range of an electromagnetic spectrum; and
the second range of the electromagnetic spectrum is at least one of an ultraviolet B range and an ultraviolet in the middle range of the electromagnetic spectrum.

3. The component of claim 1 wherein:
the plastic composition further comprises at least one colorant, wherein the colorant reflects electromagnetic radiation in the visible radiation range of the electromagnetic spectrum, and does not absorb electromagnetic radiation in the first ultraviolet range of the electromagnetic spectrum.

4. The component of claim 1 wherein:
the plastic composition further comprises at least one colorant wherein the colorant comprises a dye.

5. The component of claim 1 wherein:
the plastic composition further comprises at least one colorant wherein the colorant has a particle size of less than or equal to 0.50 microns.

6. The component of claim 1 wherein:
the photoluminescent interior member is color matched in the visible radiation range of the electromagnetic spectrum to at least one interior member of the motor vehicle which is not photoluminescent.

7. The component of claim 1 wherein:
the at least one photoluminescent material absorbs electromagnetic radiation in the ultraviolet A range between 320-390 nanometers, and thereafter emits electromagnetic radiation in a visible radiation range between 400-750 nanometers.

8. The component of claim 7 wherein:
wherein the at least one photoluminescent material emits electromagnetic radiation in a visible radiation range of blue, green, yellow or red individually or combination.

9. The component of claim 1 wherein:
the photoluminescent interior member comprises at least one of an instrument panel member, a sidewall member, a console member, an overhead member, a pillar member, a floor member and a seating member.

10. The component of claim 1 wherein:
the photoluminescent interior member is arranged to illuminate at least one of a floor area of the vehicle and a storage compartment of the vehicle.

11. The component of claim 1 wherein:
the photoluminescent interior member is arranged to illuminate at least one of a gauge, an indicator and controllers of the motor vehicle.

12. The component of claim 1 wherein:
the at least one polymer comprises at least one of a polypropylene, acrylonitrile-butadiene-styrene, polyphenylene oxide, styrene-maleic-anhydride and polycarbonate.

13. The component of claim 1 wherein:
the photoluminescent material comprises a phosphorescent material.

14. The component of claim 13 wherein:
the phosphorescent material comprises tris(2-phenyl pyridine) iridium, alkaline earth metal sulfide or aluminate crystals.

15. The component of claim 1 wherein:
the plurality of additives further comprise a second ultraviolet protector to protect the photoluminescent interior member from the electromagnetic radiation in the ultraviolet A range without absorbing electromagnetic radiation in the ultraviolet A range.

16. The component of claim 15 wherein:
the second ultraviolet protector is one of a free radical scavenger and an excited state quencher.

17. A method of illuminating an interior area of a motor vehicle comprising:
injection molding at least one photoluminescent interior member having a thickness of 1.5 mm to 2.5 mm, wherein the injection molded photoluminescent interior member is formed of a plastic composition, wherein the plastic composition comprises a blend of at least one polymer and a plurality of additives comprising at least one photoluminescent material and at least first ultraviolet protector;
wherein the at least one photoluminescent material absorbs electromagnetic radiation in a first ultraviolet range of an electromagnetic spectrum, and thereafter emits electromagnetic radiation in a visible radiation range of the electromagnetic spectrum;
wherein the first ultraviolet protector is an ultraviolet absorber, wherein the ultraviolet absorbs electromagnetic radiation in a second ultraviolet range of the electromagnetic spectrum and does not absorb electromagnetic radiation in the first ultraviolet range of the electromagnetic spectrum; and
absorbing electromagnetic radiation in the first range of the electromagnetic spectrum with the at least one photoluminescent material, and thereafter emitting electromagnetic radiation in the visible radiation range of the electromagnetic spectrum to illuminate the interior area of the motor vehicle.

18. The method of claim 17 wherein:
the first ultraviolet range of an electromagnetic spectrum is an ultraviolet A range of an electromagnetic spectrum; and
the second range of the electromagnetic spectrum is at least one of an ultraviolet B range and an ultraviolet in the middle range of the electromagnetic spectrum.

19. The method of claim 17 further comprising:
color matching the photoluminescent interior member in the visible radiation range of the electromagnetic spectrum to at least one interior member of the motor vehicle which is not photoluminescent.

20. The component of claim 1 wherein:
the injection molded photoluminescent interior member exhibits a Delta E value of less than 3.0 upon exposure to 1240 KJ/m2 in a xenon arc weatherometer.

\* \* \* \* \*